(No Model.)  5 Sheets—Sheet 1.

A. H. SUTTON.
MACHINE FOR MEASURING FABRICS AND PRINTING THE MEASURES THEREON.

No. 359,368.  Patented Mar. 15, 1887.

Witnesses:
E. Wurdeman
J. J. Masson

Inventor:
Andrew H. Sutton,
by E. E. Masson
atty.

(No Model.) 5 Sheets—Sheet 2.

A. H. SUTTON.
MACHINE FOR MEASURING FABRICS AND PRINTING THE MEASURES THEREON.

No. 359,368. Patented Mar. 15, 1887.

Witnesses:
E. C. Wurdeman
J. J. Masson

Inventor:
Andrew H. Sutton,
by E. E. Masson
atty.

(No Model.)　　　　　　　　　　　　　　　　5 Sheets—Sheet 3.
A. H. SUTTON.
MACHINE FOR MEASURING FABRICS AND PRINTING THE MEASURES THEREON.

Figure 3:
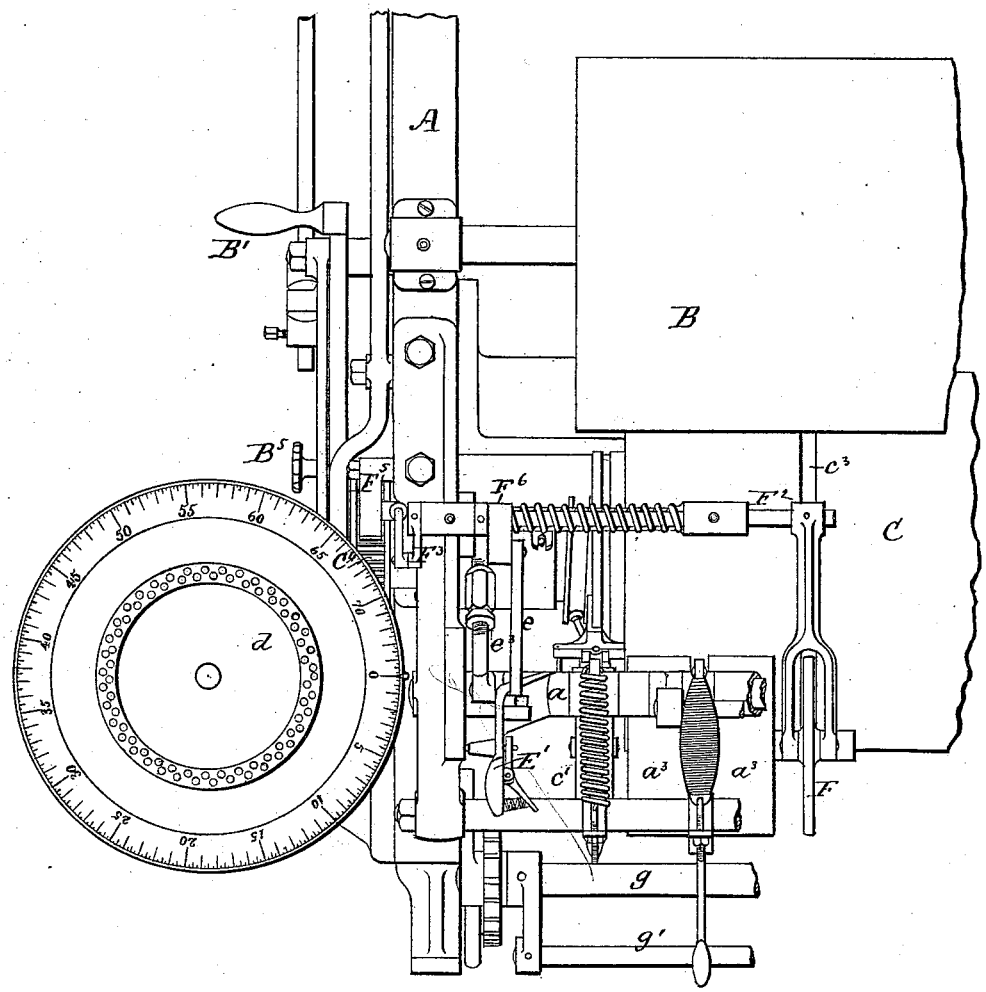

No. 359,368.　　　　Fig. 3.　Patented Mar. 15, 1887.

WITNESSES:
E. C. Hurdeman
I. J. Masson

INVENTOR
Andrew H. Sutton
BY　E. E. Masson
ATTORNEY (No Model.) 5 Sheets—Sheet 4.

A. H. SUTTON.
MACHINE FOR MEASURING FABRICS AND PRINTING THE MEASURES THEREON.

No. 359,368. Patented Mar. 15, 1887.

Witnesses:
E. C. Wurdeman
J. J. Masson

Inventor:
Andrew H. Sutton
by E. E. Masson
atty.

(No Model.)  5 Sheets—Sheet 5.
A. H. SUTTON.
MACHINE FOR MEASURING FABRICS AND PRINTING THE MEASURES THEREON.
No. 359,368.  Fig. 10.  Patented Mar. 15, 1887.
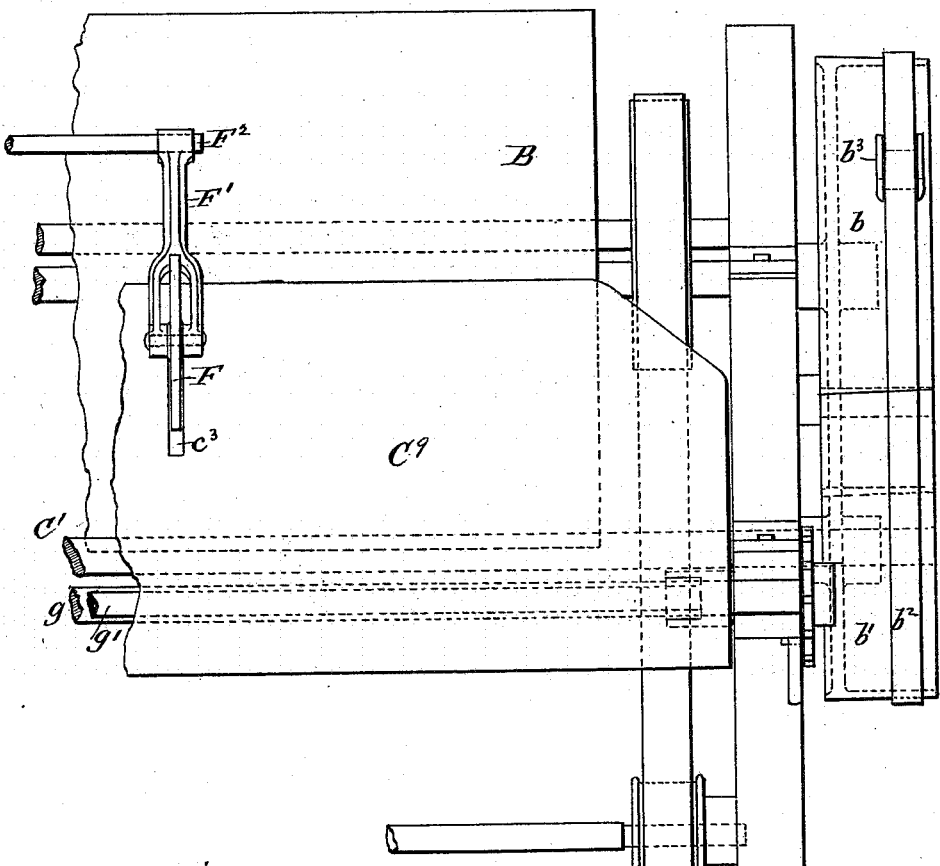
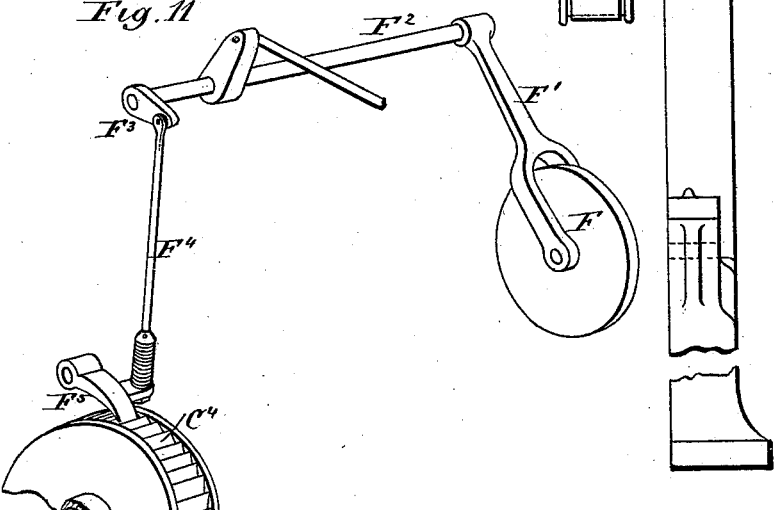
Witnesses:
E. C. Wurdeman
I. J. Masson
Inventor:
Andrew H. Sutton,
by E. E. Masson
atty.

UNITED STATES PATENT OFFICE.

ANDREW H. SUTTON, OF NEW YORK, N. Y., ASSIGNOR TO THE FABRIC MEASURING AND PACKAGING COMPANY, OF SAME PLACE.

MACHINE FOR MEASURING FABRICS AND PRINTING THE MEASURES THEREON.

SPECIFICATION forming part of Letters Patent No. 359,368, dated March 15, 1887.

Application filed August 21, 1886. Serial No. 211,537. (No model.)

*To all whom it may concern:*

Be it known that I, ANDREW H. SUTTON, a citizen of the United States, residing at New York city, in the county of New York, State of New York, have invented certain new and useful Improvements in Machines for Measuring Fabrics and Printing the Measure Thereon, of which the following is a specification, reference being had therein to the accompanying drawings.

This invention is an improvement upon the applications of A. H. Sutton and P. H. Watson, filed in the Patent Office July 30, 1883.

The object of this improvement is to provide means to automatically stop with precision a counter used in connection with a fabric-measuring machine as soon as the piece of fabric is measured, and also to provide means for directing the fabric into the machine and means for other purposes hereinafter described. I accomplish these objects by the construction illustrated in the accompanying drawings, in which—

Figure 1:
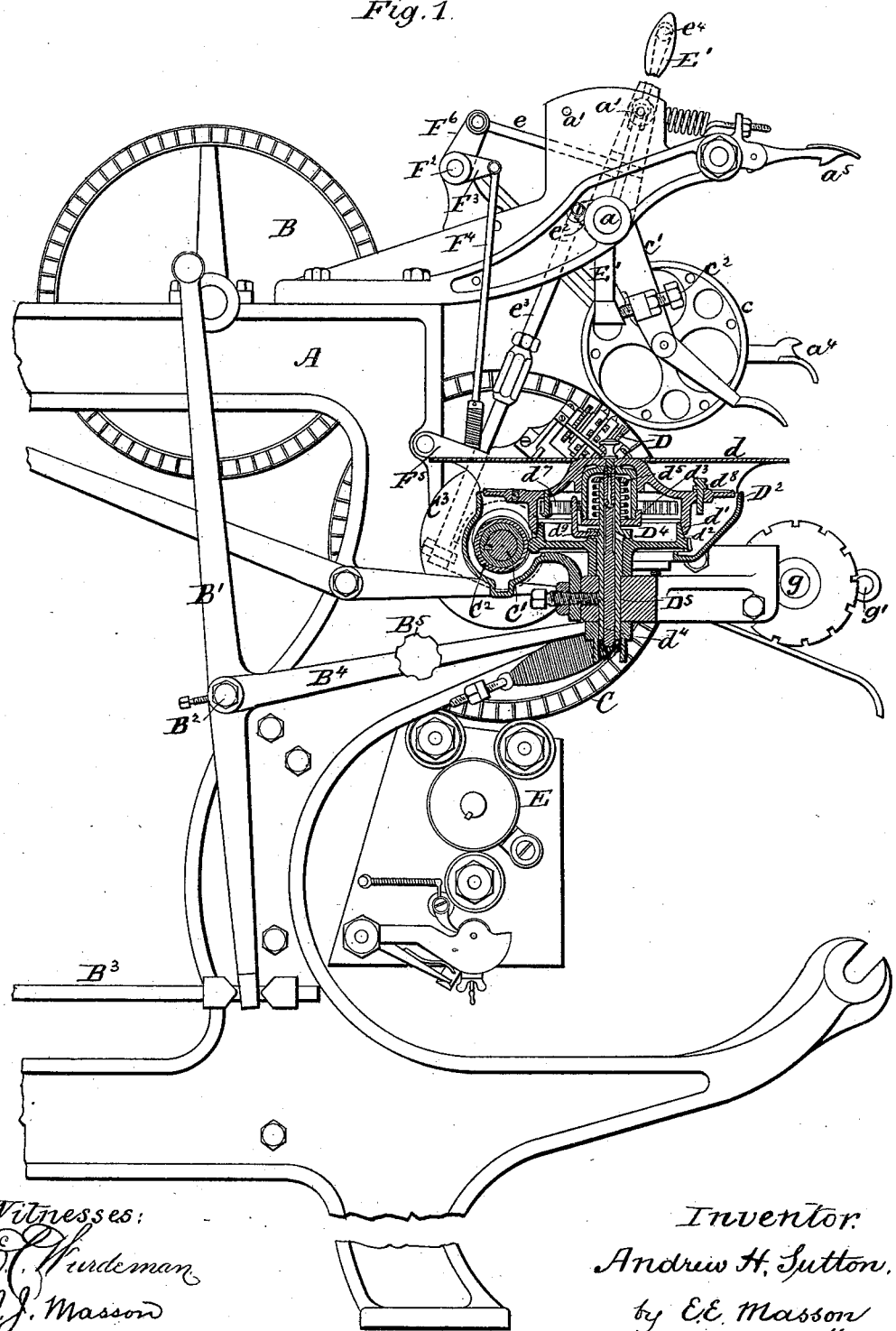
Figure 2:
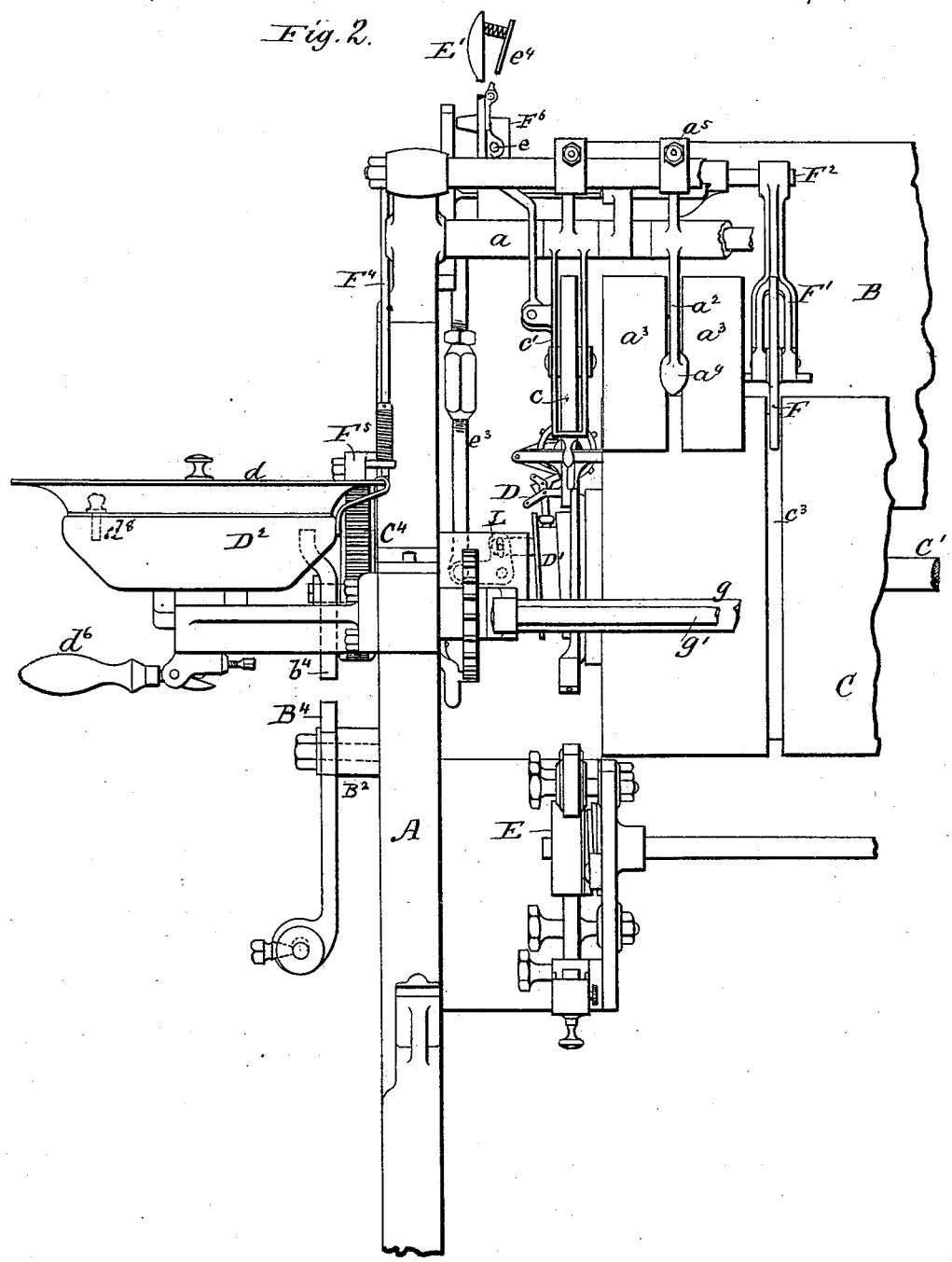
Figure 4:
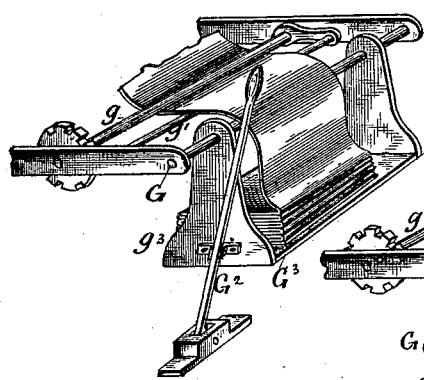
Figure 5:
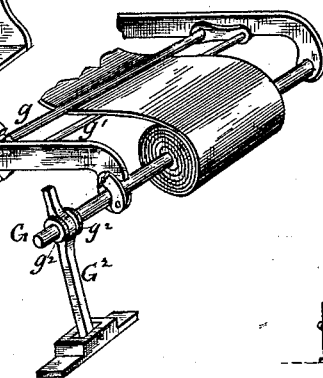
Figure 6:
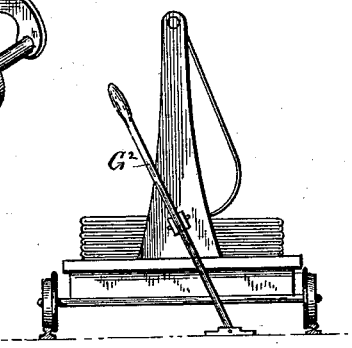
Figure 7:
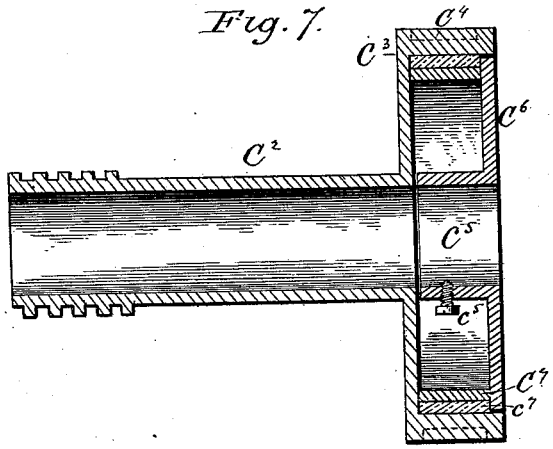
Figure 8:
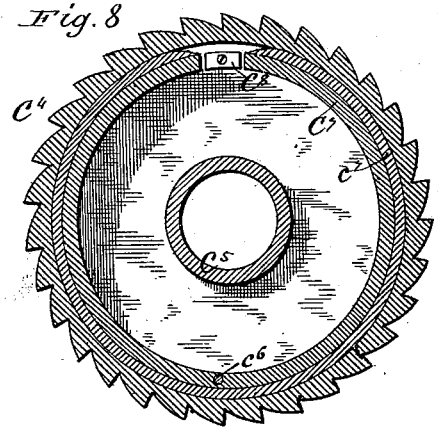
Figure 9:
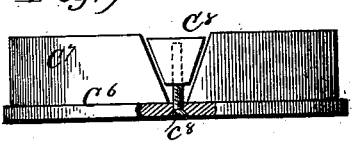

Figure 1 is a side elevation of a portion of one end of the machine to which my improvements are attached. Fig. 2 is a front elevation of the same. Fig. 3 is a plan view of the same. Figs. 4 and 5 are perspective views of the front portion of the machine, showing, respectively, the fabric on a platform suspended from a rod on the frame and upon a roll similarly suspended. Fig. 6 is a side view of a fabric-carrying carriage mounted on wheels and provided with means for moving it laterally. Fig. 7 is a horizontal section of the sleeve ratchet-wheel and clutch to operate the dial. Fig. 8 is a vertical section of the same. Fig. 9 is a top view of the same. Fig. 10 is a front view of the machine provided with an inclined platform as a support for the fabric. Fig. 11 is a perspective view showing the connections between the light-weight-controlling wheel and the ratchet-wheel and pawl stopping the index or dial of the machine.

In said drawings, A represents the frame of the machine; B, the draft-roll; C, the measuring-roll, the shaft of which carries a spider having arms carrying the printing mechanism D, the types of which are inked in their revolution by the inking mechanism E. The impression-roll $c$, placed above and in the path of the printing mechanism, is mounted upon arms $c'$, one of which is provided with an adjusting-screw, $c^2$, the point of which bears against the lower end of the trip-lever E', pivoted upon the horizontal rod $a$. The arms $c'$ are pivoted upon the rod $a$, extending across the machine, and upon said rod are also pivoted the arms $a^2$, carrying the pinching-rolls $a^3$, arranged in pairs over the measuring-roll.

The arms $a^2$ are provided with a hooked end or latch, $a^4$, to engage with a hooked spring-catch, $a^5$, when it is desired to have some of the pairs of pinching-rolls or all of them retained away from the measuring-roll.

The shipping-lever B' is pivoted to the frame at $B^2$, and actuates the shipper-rod $B^3$, and is a part of the trip-lever $B^4$, that has one end adapted to engage with the lower end of a small lever, $b^4$, in the dial-case $D^2$, and said trip-lever is also provided with a handle, $B^5$, to set it by hand. Within the dial-case $D^2$ any suitable train of gears may be used; but I prefer to attach to the under side of the dial $d$, or it may be to a central index, a hollow cone, $d'$, having an internal frictional surface, $d^2$, against which the conical surface of the gear $D^4$ is in frictional contact. This gear $D^4$ is mounted upon a hollow shaft, $D^5$, having a head, $d^5$, screwed to its upper end, and under said head is a coiled spring, the lower end of which bears against the bottom $d^3$ of a cylindrical chamber secured to the bottom of the dial.

Within the shaft $D^5$ is a rod, $d^4$, secured to the bottom of the dial, by which the latter can be pushed up by means of the trip-lever $d^6$ at the bottom thereof and the frictional surfaces be separated. To the under side of the dial is also secured one end of a horizontally-coiled spring, $d^7$, having its other end secured to a pin, $d^9$, projecting from the shaft $D^5$, and by means of this spring the dial is retracted to zero. The dial has also circles of holes to receive the drop-pin $d^8$ and arrest the dial automatically at any desired point by coming in contact with the small lever $b^4$, engaging with the end of the lever $B^4$. The gear $D^4$ meshes with a worm formed upon a sleeve, $C^2$, mounted loosely upon the projecting end of the shaft $C'$ of the measuring-roll. This sleeve has its inner end enlarged, and said enlarged end constitutes a hollow wheel, $C^3$, having ratchet-teeth $C^4$ on its periphery. Within said wheel is placed a hub, $C^5$, that is secured to the shaft $C'$ of the measuring-roll by means of a screw, $c^5$, and said hub has a flange, $C^6$, to which is fastened by screws $c^6$, passing through said flange, a segmental friction-ring, $C^7$, preferably of metal, covered with felt $c^7$, secured thereto with screws. The ring $C^7$ is not quite a full ring, and has its ends beveled, and its felt cover is a little less in diameter than the inner diameter of the wheel $C^3$, and to expand the ring $C^7$ a wedge, $C^8$, is placed between its beveled ends and is actuated by a screw, $c^8$, entering therein after passing through the flange $C^6$ of said hub $C^5$, so as to cause the desired friction between said hub and the inner surface of the wheel $C^3$ to rotate said wheel, and the latter will rotate the dial by means of the worm and wheel when the pawl $F^5$ is disengaged from the ratchet-teeth of said wheel $C^3$; but when the pawl $F^5$ is in engagement with said ratchet-teeth it holds the wheel $C^3$ and its sleeve from turning, and consequently the dial also; but the flanged hub $C^5$ and its friction-ring continue to revolve with the shaft $C'$.

To stop the dial or counter as soon as the end of a piece of fabric has passed the marking-point, either on the measuring-roll or upon a table suitably grooved and used in place of this roll, a weight, preferably in the form of a light wheel, F, is made to bear on the fabric upon said measuring-roll over a groove, $c^3$, formed therein. The wheel F is carried by a forked arm, $F'$, having its upper end secured to a horizontal rod, $F^2$, carried in bearings secured to the frame of the machine. On the outer end of this rod is secured a crank, $F^3$, from which is suspended a rod, $F^4$, having its lower end connected with the pawl $F^5$, to allow the latter to engage with the teeth on the ratchet-wheel and stop the latter, and with it the dial connected therewith, when the last end of a piece of fabric has passed the marking-point.

To have means for tripping simultaneously and by one movement of the trip-lever $E'$ the pawl $F^5$ and its connections and the marking mechanism, as well as the impression-roll, said trip-lever is connected by means of a rod, $e$, with a crank-arm, $F^6$, secured to the shaft $F^2$, and adjacent to its pivot the trip-lever $E'$ has a short crank-arm, $e^2$, to the end of which is pivoted the adjustable rod $e^3$, that connects said trip-lever to the printer-trip $D'$ by means of the bell-crank lever L, and also stops that mechanism. To retain the trip-lever $E'$ at a suitable angle to have the mechanisms above stated in working position or out of said position, said lever is provided with a spring-handle latch, $e^4$, the lower end of which enters perforations $a'$ in the frame of the machine.

Operating connection is made either by means of cone-pulleys $b$ $b'$ and a belt, $b^2$, Fig. 10, or by means of expansive or other differential regulating-pulleys between the draft-roll B and the shaft $C'$, carrying the spider of the printing mechanism, the latter shaft carrying also the roll C, when a roll is used, in place of a table or platform, $C^9$, for the fabric to pass upon while it is measured. The belt $b^2$ is retained by a suitable shipper, $b^3$, in a correct location upon the cone-pulleys to give a proper speed to the marking-mechanism, and, through the shaft of the latter, to the indicating-dial. To guide the fabric into the machine, said fabric is carried upon laterally-adjustable means easily controlled by hand or by means of a lever.

If the fabric to be measured has been received in the form of a roll, said roll is mounted upon a shaft, G, passed through its center, and said shaft is mounted in bearings at the end of the machine adjacent to the adjustable smoothing-rolls $g$ $g'$, between which the fabric is passed. A longitudinal motion can be given to the shaft G by means of a lever, $G^2$, having one end secured to the floor or to a bracket attached to the frame of the machine, and its middle portion rests between collars $g^2$ upon the shaft, by which means the latter can be moved endwise, and with it the roll of fabric placed thereupon.

If the fabric to be measured has been received in a folded form, a platform, $G^3$, is suspended from the shaft G by passing said shaft through the upper ends of brackets $g^3$, secured to the ends of said platform, and the lever $G^3$, pivoted at one end to the floor, has its middle portion loosely connected to the platform.

In place of suspending the platform $G^3$ from a rod on the machine, it may be carried on wheels resting upon the floor, as shown in Fig. 6, and be moved similarly by means of a lever, $G^2$.

The operation of the device is as follows: The fabric is threaded into the measuring-machine on top of the cylinder C (or on top of the inclined platform $C^9$, if one is used,) and under the weight or wheel F, which rests upon the upper surface of the fabric, and is thus held up, at the same time holding up the pawl $F^5$ free from the ratchet-wheel $C^3$. The wheel F is so located that the end of the fabric, as it enters the machine, moves under and supports it at the exact time that the machine begins to measure the fabric, and operates the dial to show the measurement. The fabric passing through the machine keeps the weight in this elevated position; but when the end of the measured fabric passes from under the wheel or weight F said weight instantly falls into the groove $c^3$ and carries down the pawl $F^5$, which then engages one of the teeth of the ratchet-wheel $C^3$ and at once stops the wheel C, and with it the dial, while the last part of the fabric continues to go forward and is wound up.

Having now fully described my invention, I claim—

1. The combination of the draft-roll, the printing mechanism, the fabric-support having a groove cut in its surface, and the light weight suspended over said groove with the dial, and means, substantially as described, for connecting said weight with the dial, substantially as and for the purpose described.

2. The combination of the draft-roll, the printing mechanism, the fabric-support having a groove cut in its surface, the light weight suspended over said groove and having an arm connecting said weight to a horizontal rod, with a crank attached to said rod, a pawl connected with said rod, and a ratchet-wheel mounted friction-tight upon the shaft of the printing mechanism, substantially as described.

3. The combination of the grooved fabric-support, the light weight resting thereon, the means, substantially as described, to connect it with a ratchet-wheel mounted friction-tight upon the shaft carrying the printing mechanism, the ratchet-wheel, a sleeve secured to said ratchet-wheel, and a worm upon said sleeve, with a gear-wheel and a dial or indicator connected with said gear-wheel, substantially as described.

4. The combination of a fabric-support and printing mechanism, a sleeve upon the shaft of the latter and having a ratchet-wheel provided with an internal frictional surface, with a flanged hub secured upon the shaft of the printing mechanism and having external frictional surface to bear against the frictional surface of the ratchet-wheel, and a pawl adapted to be in engagement with said ratchet-wheel, substantially as and for the purpose described.

5. The combination of a fabric-support and printing mechanism and loosely mounted upon the shaft of the latter, a ratchet-wheel having an internal frictional surface and secured upon said shaft, a flanged hub having an external frictional surface consisting of a segmental ring having beveled ends and an adjustable wedge between said ends, and a pawl adapted to be in engagement with said ratchet-wheel, substantially as described.

6. The combination of a fabric-support having a groove in its surface, a light weight suspended over said groove, a revolving printing mechanism, an impression-roll above the latter, a dial, a worm, ratchet-wheel, and pawl connected with said dial, with a trip-lever connected with said light weight and impression-roll, whereby to simultaneously lift the impression-roll and bring the pawl into engagement with the ratchet-wheel, substantially as described.

In testimony whereof I affix my signature in presence of two witnesses.

ANDREW H. SUTTON.

Witnesses:
FRANK MILLER,
E. P. WATSON.